United States Patent
Etemad et al.

(10) Patent No.: US 9,356,724 B2
(45) Date of Patent: *May 31, 2016

(54) SIGNALING FOR DOWNLINK COORDINATED MULTIPOINT IN A WIRELESS COMMUNICATION SYSTEM

(71) Applicant: Intel Corporation, Santa Clara, CA (US)

(72) Inventors: Kamran Etemad, Potomac, MD (US); Alexei Davydov, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/834,292

(22) Filed: Aug. 24, 2015

(65) Prior Publication Data

US 2015/0365937 A1  Dec. 17, 2015

Related U.S. Application Data

(63) Continuation of application No. 14/054,200, filed on Oct. 15, 2013, now Pat. No. 9,154,251, which is a continuation of application No. 13/730,289, filed on Dec. 28, 2012, now Pat. No. 9,083,479.

(60) Provisional application No. 61/646,223, filed on May 11, 2012.

(51) Int. Cl.
*H04W 72/04* (2009.01)
*H04B 7/06* (2006.01)
(Continued)

(52) U.S. Cl.
CPC ............. *H04J 3/1694* (2013.01); *H04B 1/56* (2013.01); *H04B 7/024* (2013.01); *H04B 7/0456* (2013.01);
(Continued)

(58) Field of Classification Search
CPC ............ H04W 72/04; H04W 72/0413; H04W 72/042; H04L 29/02
See application file for complete search history.

(56) References Cited

U.S. PATENT DOCUMENTS 8,638,684 B2 * 1/2014 Luo ........................ H04L 1/0027
370/236
2008/0317158 A1  12/2008 Ketchum et al.
(Continued)

FOREIGN PATENT DOCUMENTS

CN  102148791 A  8/2011
CN  101375622 B  4/2012
(Continued)

OTHER PUBLICATIONS

Office Action issued Jul. 31, 2015 from Chinese Patent Application No. 201310174340.1.
(Continued)

*Primary Examiner* — Mark Rinehart
*Assistant Examiner* — Gbemileke Onamuti
(74) *Attorney, Agent, or Firm* — Schwabe, Williamson & Wyatt, P.C.

(57) ABSTRACT

Embodiments herein describe apparatuses, systems, and methods for signaling to support downlink coordinated multipoint (CoMP) communications with a user equipment (UE) in a wireless communication network. In embodiments, the UE may be configured with a plurality of channel state information (CSI) processes (e.g., via radio resource control (RRC) signaling) to use for providing CSI feedback to an evolved Node B (eNB) to support downlink CoMP communications. The UE may be configured with a plurality of sets of CSI processes. The UE may further receive a downlink control information (DCI) message from the eNB that indicates one of the configured sets of CSI processes on which the UE is to provide CSI feedback to the UE. The UE may generate the CSI feedback for the indicated set of CSI processes, and transmit the CSI feedback to the eNB in a CSI report.

17 Claims, 7 Drawing Sheets

(51) Int. Cl.

| | | |
|---|---|---|
| H04L 5/00 | (2006.01) | |
| H04J 3/16 | (2006.01) | |
| H04B 7/26 | (2006.01) | |
| H04W 36/00 | (2009.01) | |
| H04W 24/10 | (2009.01) | |
| H04W 72/08 | (2009.01) | |
| H04J 3/00 | (2006.01) | |
| H04B 1/56 | (2006.01) | |
| H04W 56/00 | (2009.01) | |
| H04W 52/02 | (2009.01) | |
| H04W 76/02 | (2009.01) | |
| H04W 4/22 | (2009.01) | |
| H04W 36/22 | (2009.01) | |
| H04B 15/00 | (2006.01) | |
| H04W 76/04 | (2009.01) | |
| H04B 7/02 | (2006.01) | |
| H04B 7/04 | (2006.01) | |
| H04W 24/02 | (2009.01) | |
| H04W 72/12 | (2009.01) | |
| H04L 29/02 | (2006.01) | |
| H04W 4/00 | (2009.01) | |
| H04W 4/06 | (2009.01) | |
| H04W 48/20 | (2009.01) | |
| H04W 16/14 | (2009.01) | |
| H04L 29/06 | (2006.01) | |
| H04W 4/02 | (2009.01) | |
| H04J 3/26 | (2006.01) | |
| H04L 27/26 | (2006.01) | |
| H04W 72/10 | (2009.01) | |
| H04L 5/14 | (2006.01) | |
| H04W 36/32 | (2009.01) | |
| H04W 4/16 | (2009.01) | |
| H04W 36/04 | (2009.01) | |
| H04W 36/16 | (2009.01) | |
| H04W 72/00 | (2009.01) | |
| H04W 36/30 | (2009.01) | |
| H04W 36/18 | (2009.01) | |
| H04W 88/06 | (2009.01) | |
| H04W 72/02 | (2009.01) | |
| H04L 1/00 | (2006.01) | |
| H04L 1/18 | (2006.01) | |
| H04W 88/02 | (2009.01) | |

(52) U.S. Cl.
CPC ............ *H04B 7/0473* (2013.01); *H04B 7/0486* (2013.01); *H04B 7/063* (2013.01); *H04B 7/065* (2013.01); *H04B 7/0626* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/26* (2013.01); *H04L 5/001* (2013.01); *H04L 5/0035* (2013.01); *H04L 5/0096* (2013.01); *H04L 5/1469* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/16* (2013.01); *H04W 4/22* (2013.01); *H04W 16/14* (2013.01); *H04W 24/02* (2013.01); *H04W 24/10* (2013.01); *H04W 36/00* (2013.01); *H04W 36/0061* (2013.01); *H04W 36/0088* (2013.01); *H04W 36/04* (2013.01); *H04W 36/16* (2013.01); *H04W 36/22* (2013.01); *H04W 36/32* (2013.01); *H04W 48/20* (2013.01); *H04W 52/0212* (2013.01); *H04W 52/0216* (2013.01); *H04W 52/0225* (2013.01); *H04W 52/0229* (2013.01); *H04W 52/0235* (2013.01); *H04W 52/0251* (2013.01); *H04W 56/00* (2013.01); *H04W 72/005* (2013.01); *H04W 72/042* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/1215* (2013.01); *H04W 76/023* (2013.01); *H04W 76/027* (2013.01); *H04W 76/046* (2013.01); *H04W 76/048* (2013.01); *H04L 1/0026* (2013.01); *H04L 1/1803* (2013.01); *H04L 1/1822* (2013.01); *H04L 5/0053* (2013.01); *H04L 5/0073* (2013.01); *H04W 36/18* (2013.01); *H04W 36/30* (2013.01); *H04W 72/02* (2013.01); *H04W 72/1226* (2013.01); *H04W 88/02* (2013.01); *H04W 88/06* (2013.01); *Y02B 60/50* (2013.01)

(56) References Cited

U.S. PATENT DOCUMENTS

| | | |
|---|---|---|
| 2011/0158191 A1 | 6/2011 | Zhang et al. |
| 2011/0177822 A1 | 7/2011 | Takanashi |
| 2011/0188393 A1 | 8/2011 | Mallik et al. |
| 2011/0199986 A1 | 8/2011 | Fong et al. |
| 2012/0076017 A1 | 3/2012 | Luo et al. |
| 2012/0113917 A1 | 5/2012 | Gaal et al. |
| 2013/0114514 A1 | 5/2013 | Nissila et al. |
| 2013/0194940 A1 | 8/2013 | Li et al. |
| 2013/0258874 A1 | 10/2013 | Khoshnevis et al. |
| 2013/0258964 A1 | 10/2013 | Nam et al. |
| 2013/0301448 A1* | 11/2013 | Sayana ............... H04W 24/10 370/252 |
| 2013/0301548 A1 | 11/2013 | Etemad et al. |
| 2014/0126476 A1 | 5/2014 | Kang et al. |

FOREIGN PATENT DOCUMENTS

| | | | |
|---|---|---|---|
| EP | 2448338 | A1 | 5/2012 |
| JP | 2012080423 | A | 4/2012 |
| JP | 2012235352 | A | 11/2012 |
| WO | WO2010/072020 | A2 | 7/2010 |
| WO | WO2010/085909 | A1 | 8/2010 |
| WO | KR2010-100578 | A | 9/2010 |
| WO | WO2011100520 | A1 | 8/2011 |
| WO | WO2012/015154 | A1 | 3/2012 |

OTHER PUBLICATIONS

Office Action issued Sep. 4, 2015 from Finnish Patent Application No. 20135472.
Office Action issued Sep. 1, 2015 from Korean Patent Application No. 2014-7031592.
Office Action issued Sep. 9, 2015 from Finnish Divisional Application No. 20136094.
Extended European Search Report issued Dec. 10, 2015 from European Patent Application No. 13788322.9.
Office Action issued Nov. 4, 2015 from Japanese Patent Application No. 2015-511778.
International Search Report and Written Opinion mailed Aug. 23, 2013 from International Application No. PCT/US2013/040634.
Office Action issued Apr. 3, 2014 from Netherland Patent Application No. 2011790 (Google translated).
Search Report issued May 23, 2014 from Netherland Divisional Patent Application No. 2011790.
Search Report issued May 23, 2014 from Belgium Divisional Patent Application No. 2013/0771.
Office Action issued Jun. 2, 2014 from Swedish Patent Application No. 1350559-9.
Office Action issued Jun. 13, 2014 from Swedish Patent Divisional Application No. 1351336-1.

(56) References Cited

OTHER PUBLICATIONS

Search Report issued Jun. 23, 2014 from Spanish Patent Application No. 201330670.
Office Action issued Apr. 3, 2014 from French Divisional Patent Application No. 1361050 (Google Translated).
Search Report issued Jun. 23, 2014 from Spanish Patent Application No. 201330670 0.
Search Report issued Aug. 29, 2014 from French Patent Application No. 1354220.
Search Report issued Aug. 28, 2014 from Dutch Patent Application No. 2010774.
Notification Concerning Transmittal of International Preliminary Report on Patentability mailed Nov. 20, 2014 from International Application No. PCT/US2013/040634.
Office Action issued Oct. 21, 2014 from Belgium Application No. 2013/0329.
Final Office Action issued Feb. 9, 2015 from Swedish Patent Application No. 1350559-9.
Search Report issued Oct. 21, 2014 from Spanish Divisional Application No. P201331649.
Final Office Action issued Feb. 13, 2015 from Swedish Divisional Patent Application No. 1351336-1.
Office Action issued May 6, 2015 from Australian Patent Application No. 2013259173.
Search Report issued Apr. 21, 2015 from Taiwan Patent Application No. 102113447.
Office Action issued May 15, 2015 from Taiwan Divisional Patent Application No. 102140893.
R1-112711, Nokia Siemens Networks, "Cell aggregation: A unified approach to CoMP and carrier aggregation," 3GPP TSG-RAN WG1 Meeting #66, Agenda Item: 6.5.2 Standardization Impact, Athens, Greece, Aug. 22-26, 2011, 7 pages.
3GPP TR 36.819, v2.0.0, "3rd Generation Partnership Project; Technical Specification Group Radio Access Network; Coordinated Multi-Point Operation for LTE Physical Layer Aspects," TSG RAN Meeting #53, Fukuoka, Japan, Sep. 13-16, 2011, 71 pages.
R1-121538, Intel Corporation, "Views on CRS/PDSCH RE Collision in Joint Transmission," 3GPP TSG RAN WG1 Meeting #68bis, Agenda Item: 7.5.5, Dresden, Germany, Feb. 6-10, 2012, 4 pages.
R1-122628, Intel Corporation, "Periodic and aperiodic CSI feedback modes for DL CoMP," 3GPP TSG-RAN WG1 #69, Agenda Item: 7.5.1.4, Prague, Czech, May 21-25, 2012, 3 pages.
RP-111365, 3GPP Work Item "Core Part: Coordinated Multi-Point Operation for LTE—Downlink Core Part," 6 pages.
Huawei, Hisilicon, "Signalling requirements for PDSCH mapping for DL CoMP," 3GPP TSG RAN WG1 meeting #67, R1-113645, Agenda Item: 7.5.3, Nov. 14-18, 2011, San Francisco, CA (http://www/3gpp.org/ftp/tsg_ran/wg1_r11/TSGR1_67/Docs/) See p. 1, lines 10-36; p. 3, lines 1-18: p. 4, lines 1-20; and tables 1-2.
Texas Instruments, "Signaling for PDSCH Muting in Rel-10," 3GPP TSG RAN WG1 #62bis, R1-105283, Agenda Item: 6.3.1.2, Oct. 11-15, 2010, Xian, China, 7 pages.
NEC Group, "On PDSCH RE mapping in CoMP," 3GPP TSG RAN WG1 Meeting #70, R1-123248, Agenda Item: 7.5.4, Aug. 13-17, 2012, Qingdao, China, 7 pages.
Samsung, "CSI feedback modes for DL CoMP," 3GPP TSG RAN WG1 #68bis, R1-121626, Agenda item: 7.5.1.6, Mar. 26-30, 2012, Jeju, Korea, 3 pages.
ZTE, "CSI feedback modes for CoMP," 3GPP TSG RAN WG1 Meeting #68bis, R1-121042, Agenda item: 7.5.1.6, Mar. 26-30, 2012, Jeju, Korea, 12 pages.
Panasonic, "DCI for Rel-11 CoMP Operations," 3GPP TSG RAN WG1 Meeting #68bis R1-121155, Agenda Item: 1.5.5 Coordinated MultiPoint-operation, Mar. 26-30, 2012, Jeju, Korea, 3 pages.
Hou et al., "Impact of channel asymmetry on performance of downlink base station cooperative transmission with non-orhogonal training," IEEE Transactions on Vehicular Technology, vol. 60, No. 9, Nov. 2011, pp. 4633-4639.
Office Action issued Dec. 21, 2015 from Chinese Divisional Application No. 201310572255.0.
Office Action issued Feb. 5, 2016 from Canadian Patent Application No. 2,871,120, 3 pages.

\* cited by examiner

| CRS Configuration | Number of CRS antenna ports | CRS frequency shift |
|---|---|---|
| 0 | 4 | 2 |
| 1 | 4 | 1 |
| 2 | 4 | 0 |
| 3 | 2 | 2 |
| 4 | 2 | 1 |
| 5 | 2 | 0 |
| 6 | 1 | 5 |
| 7 | 1 | 4 |
| 8 | 1 | 3 |
| 9 | 1 | 2 |
| 10 | 1 | 1 |
| 11 | 1 | 0 |

SIGNALING FOR DOWNLINK COORDINATED MULTIPOINT IN A WIRELESS COMMUNICATION SYSTEM

CROSS REFERENCE TO RELATED APPLICATIONS

The present application is a continuation of U.S. patent application Ser. No. 14/054,200, filed Oct. 15, 2013, entitled "SIGNALING FOR DOWNLINK COORDINATED MULTIPOINT IN A WIRELESS COMMUNICATION SYSTEM," which is a continuation of U.S. patent application Ser. No. 13/730,289, filed Dec. 28, 2012, entitled "SIGNALING FOR DOWNLINK COORDINATED MULTIPOINT IN A WIRELESS COMMUNICATION SYSTEM," which claims priority to U.S. Provisional Patent Application No. 61/646,223, filed May 11, 2012, entitled "ADVANCED WIRELESS COMMUNICATION SYSTEMS AND TECHNIQUES," the entire disclosures of which are hereby incorporated by reference.

FIELD

Embodiments of the present invention relate generally to the field of communications, and more particularly, to signaling for downlink coordinated multipoint communications in a wireless communication system.

BACKGROUND

Coordinated multipoint (CoMP) systems have been developed in order to improve various operational parameters in wireless networks. There are three types of CoMP systems: joint transmission (JT); dynamic point selection (DPS); and cooperative scheduling and cooperative beamforming (CS/CB). In JT CoMP, both a serving point, e.g., an enhanced node base station (eNB), and a coordinating point, e.g., another eNB, may send the same data to a user equipment (UE). In DPS CoMP, a transmission point may be dynamically selected among different candidates, e.g., a macro-node eNB and a pico-node eNB. In CS/CB CoMP, coordinating nodes may suppress interference of interfering channels. However, the eNB may not have sufficient control and signaling mechanisms for effective management of CoMP communications with a UE.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for signaling to support downlink coordinated multipoint communications in a wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
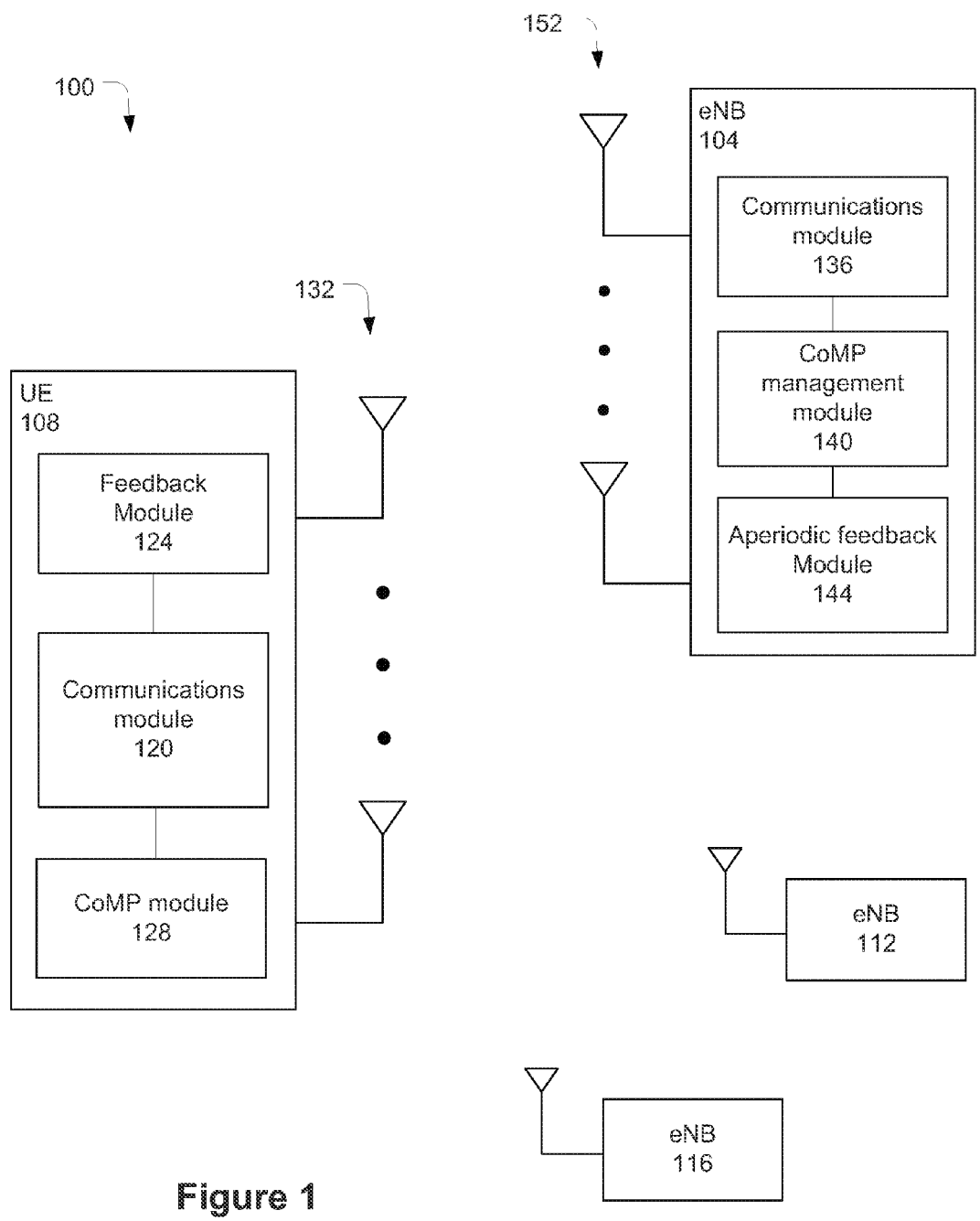
FIG. 1 schematically illustrates a wireless communication network including a user equipment (UE) and a plurality of evolved Node Bs (eNBs) in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal terrestrial radio access network (E-UTRAN). The network 100 may include a base station, e.g., enhanced node base station (eNB) 104, configured to wirelessly communicate with user equipment (UE) 108.

At least initially, the eNB 104 may have an established wireless connection with the UE 108 and may operate as a serving node within a CoMP measurement set. One or more additional eNBs of the network 100, e.g., eNBs 112 and 116, may also be included within the CoMP measurement set. eNBs 112 and 116 may be configured to facilitate wireless communication with the UE 108 through coordination with the eNB 104. The one or more additional eNBs may be collectively referred to as "coordinating nodes." An eNB may transition between coordinating and serving node roles.

The serving node and coordinating nodes may communicate with one another over a wireless connection and/or a wired connection (e.g., a high-speed fiber backhaul connection).

The eNBs may each have generally the same transmission power capabilities as one another or, alternatively, some of the eNBs may have relatively lower transmission power capabilities. For example, in one embodiment the eNB 104 may be a relatively high-power base station such as a macro eNB, while the eNBs 112 and 116 may be relatively low-power base stations, e.g., pico eNBs and/or femto eNBs.

The eNB 104 may be configured to communicate with the UE 108 over one or more component carriers. Each component carrier may be associated with a frequency band used for communications on the component carrier. Individual component carriers may be considered separate cells in some embodiments. In some embodiments, the eNB 104 may communicate with the UE 108 over a plurality of the component carriers (of different frequencies) using carrier aggregation. The UE 108 may receive control information on a primary serving cell, and may receive other information on secondary serving cells. The primary and secondary serving cells may be associated with respective component carriers. Carrier aggregation may be used in addition to, or instead of, CoMP communications.

The UE 108 may include a communications module 120 and a feedback module 124 coupled with one another. The UE 108 may further include a CoMP module 128 coupled with the communications module 120 and/or feedback module 124. The communications module 120 may be further coupled with one or more of a plurality of antennas 132 of the UE 108 for communicating wirelessly over network 100.

The UE 108 may include any suitable number of antennas. In various embodiments, the UE 108 may include at least as many antennas as a number of simultaneous spatial layers or streams received by the UE 108 from the eNBs, although the scope of the present disclosure may not be limited in this respect. The number of simultaneous spatial layers or streams may also be referred to as transmission rank, or simply rank.

One or more of the antennas 132 may be alternately used as transmit or receive antennas. Alternatively, or additionally, one or more of the antennas 132 may be dedicated receive antennas or dedicated transmit antennas.

eNB 104 may include a communications module 136, a CoMP management module 140, and an aperiodic feedback module 144 coupled with one another at least as shown. The communications module 136 may be further coupled with one or more of a plurality of antennas 152 of the eNB 104. The communications module 136 may communicate (e.g., transmit and/or receive) with one or more UEs (e.g., UE 108). In various embodiments, the eNB 104 may include at least as many antennas as a number of simultaneous transmission streams transmitted to the UE 108, although the scope of the present disclosure may not be limited in this respect. One or more of the antennas 152 may be alternately used as transmit or receive antennas. Alternatively, or additionally, one or more of the antennas 152 may be dedicated receive antennas or dedicated transmit antennas.

In various embodiments, the UE 108 may be configured with one or more CSI processes for an individual cell (e.g., component carrier). A CSI process may include an associated CSI-reference signal (CSI-RS) resource and/or an associated CSI-interference measurement (CSI-IM) resource. In some embodiments, the CSI-RS resource may be a non-zero power (NZP) CSI-RS resource. The UE 108 may further receive a cell index and/or a CSI process identifier (ID) (e.g., within a given cell) associated with each configured CSI process. The one or more CSI processes may be configured for the UE 108 (e.g., by the eNB 104) using higher layer signaling, such as via radio resource control (RRC) signaling. The CSI processes may be used for the UE 108 to generate CSI feedback for the eNB 104 to facilitate downlink CoMP communication with the UE 108.

In various embodiments, the feedback module 124 of the UE 108 may receive, via the communications module 120, a downlink control information (DCI) message from the eNB 104. The DCI message may be received, for example, on a physical downlink control channel (PDCCH). The PDCCH may in some embodiments be an enhanced PDCCH (EPDCCH) or other type of PDCCH. The DCI message may include a CSI request field to indicate one or more CSI processes for which the UE 108 is to provide CSI feedback to the eNB 104. Accordingly, the DCI message may facilitate aperiodic reporting of CSI feedback by the UE 108. In some embodiments, the CSI request field may be two bits to indicate one of four possible values. Other embodiments of the CSI request field may include other quantities of bits.

The feedback module 124 may generate the CSI feedback for the indicated CSI processes. The CSI feedback may include, for example, a channel quality indicator (CQI), a precoding matrix indicator (PMI), one or more selected subbands, and/or a rank indicator (RI) for the CSI process. The feedback module 124 may then transmit, via the communications module 120, a CSI report to the eNB 104 that includes the generated CSI feedback. The CSI report may be transmitted, for example, on a physical uplink shared channel (PUSCH).

Figure 2:
FIG. 2 is a table that maps values of a channel state information (CSI) request field to trigger aperiodic CSI feedback in accordance with various embodiments.

FIG. 2 illustrates a table 200 that maps values of a two-bit CSI request field in accordance with some embodiments. As shown in table 200, the CSI request field may have a value '01' to indicate that the feedback module 124 is to provide a CSI report for a first set of CSI processes configured for a serving cell of the UE 108. The serving cell may be a primary serving cell on which the UE 108 receives the DCI that includes the CSI request field. In some embodiments, the UE 108 may identify the serving cell for which the UE 108 is to provide the CSI feedback based on the component carrier on which the UE 108 receives the DCI.

In some embodiments, the value '01' may indicate that the UE 108 is to provide the CSI feedback for all of the CSI processes associated with the serving cell (e.g., the first set of CSI processes may include all the CSI processes associated with the serving cell). In other embodiments, the first set of CSI processes may include a subset (e.g., less than all) of the CSI processes associated with the serving cell. For example, the first set of CSI processes may be configured for the UE 108 via higher layers (e.g., via RRC signaling).

In various embodiments, the CSI request field may have a value a value '10' to indicate that that the feedback module 124 is to provide a CSI report for a second set of CSI processes. Alternatively, the CSI request field may have a value '11' to indicate that the feedback module 124 is to provide a CSI report for a third set of CSI processes. The second set and/or third set of CSI processes may be configured by higher layers (e.g., RRC signaling), for example by the eNB 104, to indicate the CSI processes that are included in the second and/or third sets.

The CSI report for the first set, second set and/or third set may be used by the eNB 104 to manage downlink CoMP communications with the UE 108. In some embodiments, the CSI report for the first set, second set and/or third set may be used by the eNB 104 to manage carrier aggregation communications with the UE 108 in addition to CoMP communications. The CSI request field may be similar to a CSI request field used to trigger CSI reports to support carrier aggregation communications. However, the CSI request field for carrier aggregation may only trigger CSI reports for one CSI process of a specific cell or set of cells, and may not allow triggering of CSI reports for more than one CSI process associated with a given cell and/or associated with different cells. Furthermore, the second and/or third sets of CSI processes may include CSI processes on different cells of the same frequency (e.g., cells of the same frequency that are transmitted by different eNBs).

In some embodiments, the CSI request field as described herein may be used when the UE 108 is configured in transmission mode 10, as defined in LTE Advanced Release 11. Transmission mode 10 may support CoMP communications with the UE. In transmission mode 10, the UE 108 may provide CSI feedback for one or more CSI processes as described herein. The UE 108 may receive scheduling information using DCI format 2D. In some embodiments, DCI format 1A may be used as a fall-back mode. The UE 108 may also receive PDSCH mapping parameters for other cells besides the serving cell. Additionally, or alternatively, the UE 108 may use UE-specific reference signals for demodulation of the PDSCH.

The second set and/or third set of CSI processes may include any number of one or more CSI processes. In some embodiments, the second set and/or third set may include a plurality of CSI processes. The second set and third set may include one or more common CSI processes in some embodiments (e.g., one or more CSI processes that are included in both the second set and the third set). In other embodiments, the second set and third set may each include only one CSI process. The CSI processes of the second set and/or third set may include one or more CSI processes that are associated with a different cell from the serving cell. Additionally, or alternatively, the second set and/or third set may include a plurality of CSI processes associated with different cells.

In various embodiments, the CSI request field may include a value '00' to indicate that no aperiodic CSI report is triggered by the DCI message. The value '00' may be used, for example, when a DCI message is transmitted to the UE 108 for another purpose besides to trigger aperiodic CSI reporting.

Although specific values for the two-bit CSI request field are shown in table 200, it will be apparent that the values may be mapped to corresponding actions in any suitable manner, which may differ from that shown in table 200. For example, in another embodiment, the value '00' may trigger CSI reporting for the first set of CSI processes.

As described herein, the CSI request field may be used by the eNB 104 to trigger CSI reports for a set of CSI processes.

The eNB 104 may dynamically change the set of CSI processes for which the eNB 104 requests CSI feedback from the UE 104. The aperiodic feedback module 144 of the eNB 104 may receive the CSI reports and the CoMP management module 140 may use the CSI feedback information included in the CSI reports to manage downlink CoMP communications with the UE.

In other embodiments, the CSI request field may include only one bit. The bit may have a first value (e.g., '1') to trigger a CSI report for all CSI processes of the serving cell. The bit may have a second value (e.g., '0') if no CSI report is triggered by the DCI message. The one-bit CSI request field may be used, for example, when the UE 108 is using a transmission mode with a common search space for PDCCH decoding (as opposed to a UE-specific search space).

Figure 3:
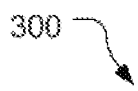
FIG. 3 is a table that maps values of another CSI request field in accordance with various embodiments.

FIG. 3 illustrates a table 300 that maps values of a two-bit CSI request field in accordance with another embodiment. As shown in FIG. 3, the two-bit CSI request field may include a value '01' to indicate that the UE 108 is to provide a CSI report for a first set of CSI processes, or a value '10' to indicate that the UE 108 is to provide a CSI report for a second set of CSI processes. The CSI request field may further include a value '11' to indicate that the UE 108 is to provide a CSI report for both the first set and second set of CSI processes. The CSI request field may include a value '00' to indicate that no aperiodic CSI report is triggered by the DCI message.

It will be apparent that other suitable configurations of the CSI request field, besides the configurations shown in FIGS. 2 and 3, may be used for triggering aperiodic CSI reports for different sets of CSI processes. For example, in another embodiment, the CSI request field may be similar to that shown in table 300, but with the value '00' to indicate that the UE 108 is to provide a CSI report for a set of CSI processes configured for the serving cell.

Figure 4:
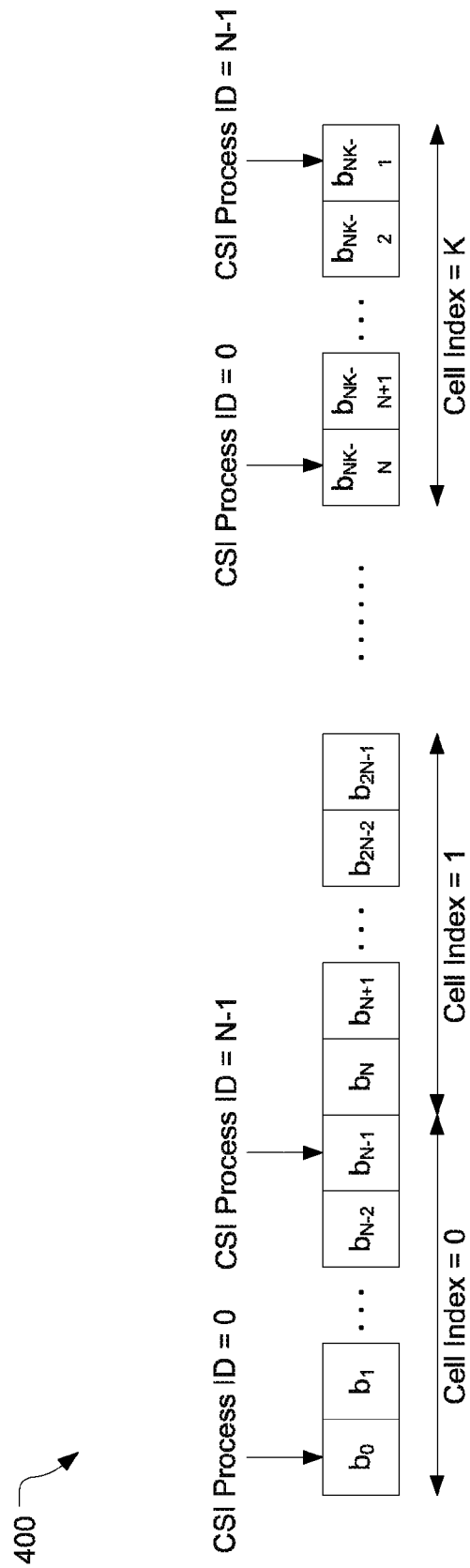
FIG. 4 illustrates a bitmap that may be used to indicate one or more CSI processes that are included in a set of CSI processes for triggering aperiodic CSI feedback in accordance with various embodiments.

In various embodiments, the sets of CSI processes that may be triggered for CSI reporting by the CSI request field (e.g., the first, second, and/or third sets described above) may be configured by the eNB 104 using respective bitmaps. The bitmaps may be transmitted to the UE 108 by the eNB 104 (e.g., via RRC signaling) to indicate which CSI processes are included in a given set of CSI processes. For example, FIG. 4 illustrates a bitmap 400 in accordance with various embodiments. Bitmap 400 includes a plurality of bits (e.g., bits $b_0$, $b_1$, ... $b_{NK-1}$), and individual bits may correspond to individual CSI processes to indicate if the CSI process is included in the set of CSI processes defined by the bitmap 400. The bits may be ordered in the bitmap 400 according to the cell index (e.g., in increasing order of cell index), and bits corresponding to CSI processes associated with the same cell index may be ordered by their respective CSI IDs. For example, bitmap 400 includes bits corresponding to K+1 component carriers (e.g., with cell index 0 to cell index K). Each component carrier may include a maximum of N configured CSI processes. The groups of bits corresponding to CSI processes having the same cell index are arranged in the bitmap 400 in increasing order of cell index (e.g., with the bits corresponding to the CSI processes of cell index 0 ($b_0$-$b_{N-1}$) disposed in the bitmap 400 before the bits corresponding to the CSI processes of cell index 1 ($b_N$-$b_{2N-1}$)). Within the groups of bits corresponding to CSI processes with the same cell index, the bits are ordered in increasing order of CSI process ID. For example, bit $b_0$ corresponds to the CSI process with cell index 0 and CSI process ID 0, and bit $b_1$ corresponds to the CSI process with cell index 0 and CSI process ID 1, etc.

As discussed above, the eNB 104 may transmit a plurality of bitmaps similar to bitmap 400 to define different sets of CSI processes for aperiodic CSI reporting. The aperiodic CSI reporting for an individual set may then be triggered by a DCI message including a CSI request field as described herein. In some embodiments, the bitmaps to define the sets of CSI processes for aperiodic CSI reporting may be transmitted as part of the CSI process configuration process (e.g., upon the UE 108 becoming RRC connected with the eNB 104). For example, the CoMP management module 140 of the eNB 104 may transmit the bitmaps contemporaneously with the CSI process configuration information (e.g., the CSI-RS resource and/or CSI-IM resource) for the individual CSI processes. Additionally, or alternatively, the bitmaps may be transmitted separately from the CSI process configuration information to define and/or modify the sets of CSI processes for aperiodic CSI reporting.

In some embodiments, the CoMP management module 140 of the eNB 104 may further transmit a codebookSubsetRestriction parameter associated with individual CSI processes. The codebookSubsetRestriction parameter may be transmitted as part of the configuration of the CSI processes. The codebookSubsetRestriction parameter may indicate a subset of PMIs within a codebook to be used by the UE 104 for CSI reporting for the respective CSI process. Alternatively, or additionally, the codebookSubsetRestriction parameter may be configured for each NZP CSI-RS resource and/or subset of subframes.

In some embodiments, the eNB 104 may configure one or more CSI dependencies between a plurality of configured CSI processes. For example, the eNB 104 may indicate for the UE 108 to report CSI feedback for a plurality of CSI processes on the same rank and/or over the same preferred subbands.

As discussed above, the feedback module 124 of the UE 108 may generate CSI feedback for one or more CSI processes triggered by the CSI request field. The CSI feedback may be generated based on the CSI-RS resource and/or CSI-IM resource configured for the CSI process. The CSI feedback may include, for example, a CQI, a PMI, one or more selected subbands, and/or an RI for the CSI process. The UE 108 may transmit the CSI feedback to the eNB 104 in a CSI report.

In some embodiments, the CSI feedback for a plurality of CSI processes may be concatenated in a same CSI report. For example, the CSI feedback for multiple CSI processes may be concatenated according to the CSI process index and/or cell index of the CSI process. In one embodiment, the CSI feedback for groups of CSI processes associated with a same component carrier (e.g., having the same cell index) may be ordered in the CSI report in increasing order of cell index. The CSI feedback may be arranged within the individual groups in increasing order of the CSI process indexes of the individual CSI processes having the same cell index.

In some cases, one or more components of the CSI feedback for a first CSI process may be the same as one or more components of the CSI feedback for the second CSI process. For example, the RI reported for the first and second CSI processes may be the same. In some embodiments, the shared component (e.g., the RI in this example) may be omitted from the CSI report for the first CSI process or the second CSI process. This may reduce the bandwidth required for the CSI report.

In some embodiments, the CSI report may be encoded using turbo coding and/or cyclic redundancy check (CRC) encoding. For example, turbo coding and/or CRC encoding may be used to encode the CQI and PMI reports. This may facilitate having a CSI report with a large payload size.

Figure 5:
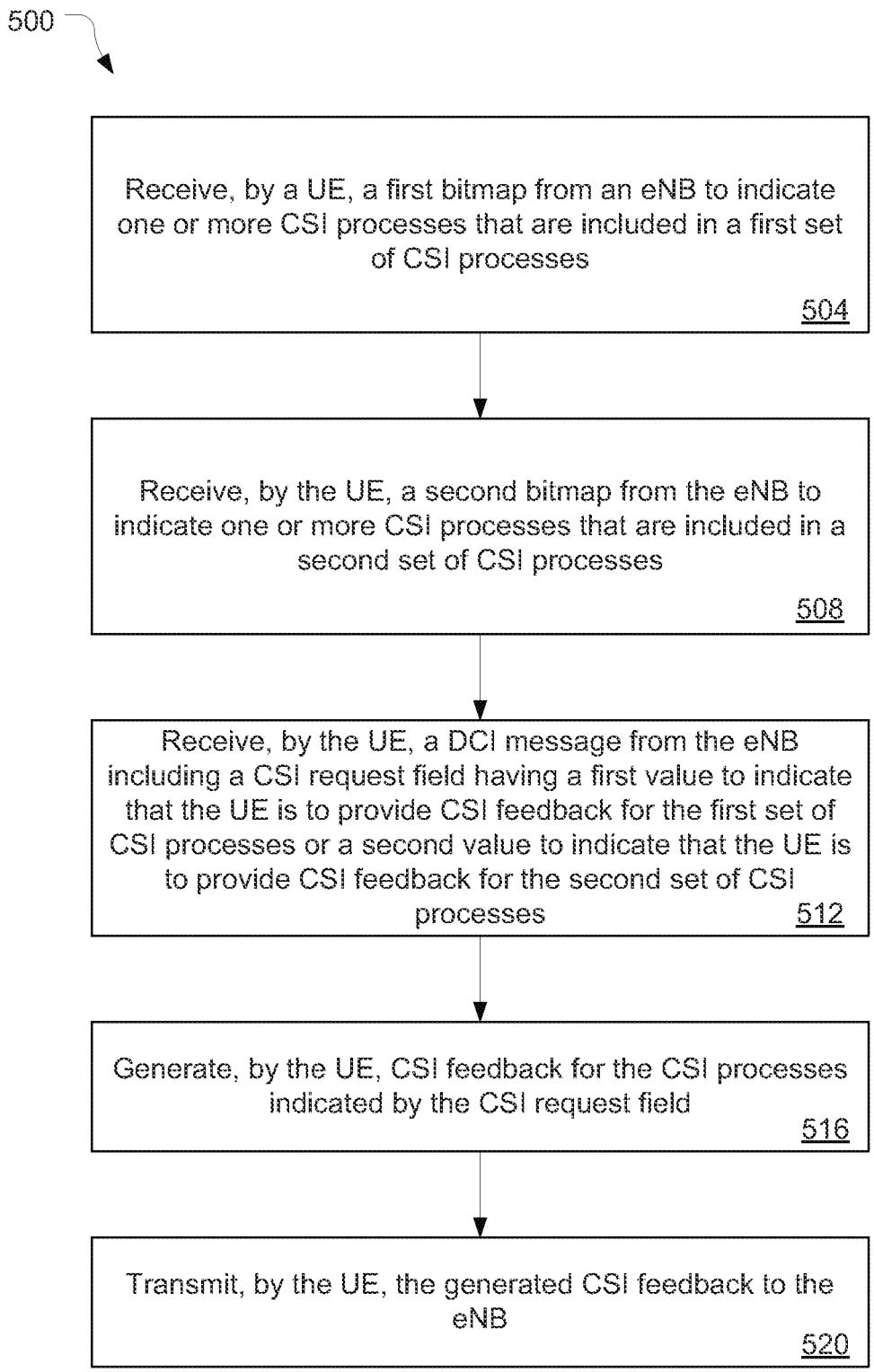
FIG. 5 is a flowchart illustrating a method for triggering aperiodic CSI feedback that may be performed by a UE in accordance with various embodiments.

FIG. 5 is a flowchart illustrating a method 500 for triggering aperiodic CSI feedback in accordance with various embodiments. Method 500 may be performed by a UE, such as UE 108. In some embodiments, the UE may include and/or have access to one or more computer-readable media having instructions stored thereon, that, when executed, cause the UE to perform the method 500. Additionally, or alternatively, in some embodiments, the UE may include circuitry to perform the method 500.

At 504, the UE may receive a first bitmap (e.g., bitmap 400) from an eNB (e.g., eNB 104) over a wireless communication network (e.g., network 100). The first bitmap may indicate one or more CSI processes that are included in a first set of CSI processes. For example, the first bitmap may include a plurality of bits, and individual bits may correspond to individual CSI processes to indicate if the CSI process is included in the first set of CSI processes. Individual bits may have a first value (e.g., '1') to indicate that the corresponding CSI process is included in the first set, or a second value (e.g., '0') to indicate that the corresponding CSI process is not included in the first set. In some embodiments, the plurality of bits may be ordered in the bitmap according to a cell index of the CSI process (e.g., in increasing order of cell index), and the bits corresponding to CSI processes with the same cell index may be ordered by a CSI process ID of the CSI process (e.g., in increasing order of CSI process ID).

At 508, the UE may receive a second bitmap from the eNB. The second bitmap may indicate one or more CSI processes that are included in a second set of CSI processes. The second bitmap may have a similar arrangement of bits to that described above for the first bitmap, but with different bits being set to the first value (e.g., '1'). In some embodiments, the first and second sets may include one or more CSI processes in common.

At 512, the UE may receive a DCI message from the eNB. The DCI message may include a CSI request field to request CSI feedback to support downlink CoMP transmission to the UE. In some embodiments, the CSI request field may include two bits to form one of four values. The CSI request field may have a first value to indicate that the UE is to provide CSI feedback for the first set of CSI processes (e.g., configured at 504), or a second value to indicate that the UE is to provide CSI feedback for the second set of CSI processes (e.g., configured at 508).

At 516, the UE may generate CSI feedback for the CSI processes indicated by the CSI request field.

At 520, the UE may transmit the generated CSI feedback to the eNB. The CSI feedback may be included in one or more CSI reports.

In some embodiments, the CSI request field may have a third value to indicate that the UE is to provide CSI feedback for a set of CSI processes configured for a serving cell of the UE. The serving cell may be identified by the component carrier on which the eNB transmits the DCI to the UE that includes the CSI request field. The set of CSI processes configured for the serving cell may include all the CSI processes configured for the serving cell or a subset of all the CSI processes configured for the serving cell.

In some embodiments, the CSI request field may have a fourth value to indicate that no CSI report is triggered by the DCI message.

In other embodiments, the third or fourth value of the CSI request field may be used to indicate that the UE is to provide CSI feedback for both the first set and second set of CSI processes (e.g., as configured at 504 and 508, respectively).

In various embodiments, the UE 108 may receive information related to a resource element mapping configuration of a physical downlink shared channel (PDSCH) for the UE 108 to use to receive the PDSCH. In some embodiments, the CoMP module 128 of the UE 108 may receive an RRC message from the eNB 104 that includes PDSCH resource element mapping parameters for a plurality of PDSCH mapping configurations. The PDSCH resource element mapping parameters may include, for example, a number of cell-specific reference signal (CRS) antenna ports, a CRS antenna port shift, a PDSCH starting symbol, a multicast-broadcast single frequency network subframe configuration for the individual PDSCH mapping configurations. In some embodiments, the PDSCH resource element mapping parameters may further include a non-zero power CSI-RS identifier and/or a CSI process identifier associated with the PDSCH mapping configuration. The PDSCH mapping configurations may be further associated with (either explicitly or implicitly) a PDSCH mapping configuration ID.

Any suitable number of PDSCH mapping configurations may be configured for the UE 108. For example, in one embodiment, four PDSCH mapping configurations may be configured for the UE 108. In some embodiments, the PDSCH mapping configurations may be generic (e.g., not associated with specific cells). In other embodiments, the PDSCH mapping configurations may be associated with respective individual cells.

Figure 6:
FIG. 6 is a table that maps values of a cell-specific reference signal (CRS) configuration parameter to corresponding values for a number of CRS antenna ports and a CRS frequency shift in accordance with various embodiments.

In some embodiments, the number of CRS antenna ports and the CRS antenna port shift may be jointly encoded into a CRS configuration parameter. For example, FIG. 6 illustrates a table 600 that shows the mapping of a value of the CRS configuration parameter to corresponding values for the number of CRS antenna ports and the CRS antenna port shift. As shown in table 600, a first value (e.g., value 0) of the CRS configuration parameter may indicate that the PDSCH mapping configuration has 4 antenna ports and a CRS frequency shift of 2 subframes. In some embodiments, a PDSCH mapping configuration may have a number of antenna ports of 1, 2, or 4. A PDSCH mapping configuration with 1 antenna port may have one of six CRS frequency shifts (e.g., 0, 1, 2, 3, 4, or 5 subframes), while a PDSCH mapping configuration with 2 or 4 antenna ports may have one of three CRS frequency shifts (e.g., 0, 1, or 2 subframes). Accordingly, jointly encoding the number of CRS antenna ports and the CRS antenna port shift may require one fewer bit than encoding them separately.

In various embodiments, the UE 108 may receive a DCI message from the eNB 104 indicating one of the PDSCH mapping configurations (e.g., a first PDSCH mapping configuration) of the plurality of PDSCH mapping configurations for the UE 108 to use to receive the PDSCH. For example, the DCI message may include the PDSCH mapping configuration ID corresponding to one of the PDSCH mapping configurations that were configured using RRC signaling as described above. In some embodiments, the PDSCH mapping configuration ID may be jointly encoded with a component carrier indicator that indicates a first component carrier, of a plurality of configured component carriers, on which the PDSCH is to be transmitted to the UE 108. For example, the DCI message may include a carrier aggregation cell identification field (CIF) that indicates the PDSCH mapping configuration and the component carrier for the UE to use to receive the PDSCH. In some embodiments, the CIF may be three bits. The three-bit CIF may have eight different values to indicate one of two component carriers and one of four PDSCH mapping configurations. In other embodiments, the PDSCH mapping configuration ID may be included in a separate field from the CIF.

The UE 108 may use the PDSCH resource element mapping parameters to receive the PDSCH via CoMP communication. For example, the PDSCH resource element mapping parameters may facilitate the avoidance of CRS to PDSCH collision. For joint transmission (JT) CoMP, the UE 108 may use the mapping parameters to determine the instantaneous rate matching pattern when resource element muting is used to mitigate CRS to PDSCH collision. For dynamic point selection (DPS), the mapping parameters may be used to avoid the need for resource element muting. Additionally, for DPS in transmission modes 1, 2, 3 and 4, as proposed in the LTE-Advanced Standard Release 11, the UE 108 may use the PDSCH resource element mapping parameters to determine the specific CRS that should be used for demodulation of the PDSCH.

In embodiments in which the PDSCH mapping configurations are associated with respective individual cells (component carriers), the transmitting cell may be indicated to the UE 108 to indicate the PDSCH mapping configuration for the UE to use to receive the PDSCH. In some embodiments, the carrier aggregation CIF may be used to indicate the transmitting cell for downlink CoMP (e.g., using values of the CIF that are not used for carrier aggregation). It will be apparent that other bit-sizes and/or arrangements may be used to indicate the PDSCH mapping configuration for the UE 108 to use.

Figure 7:
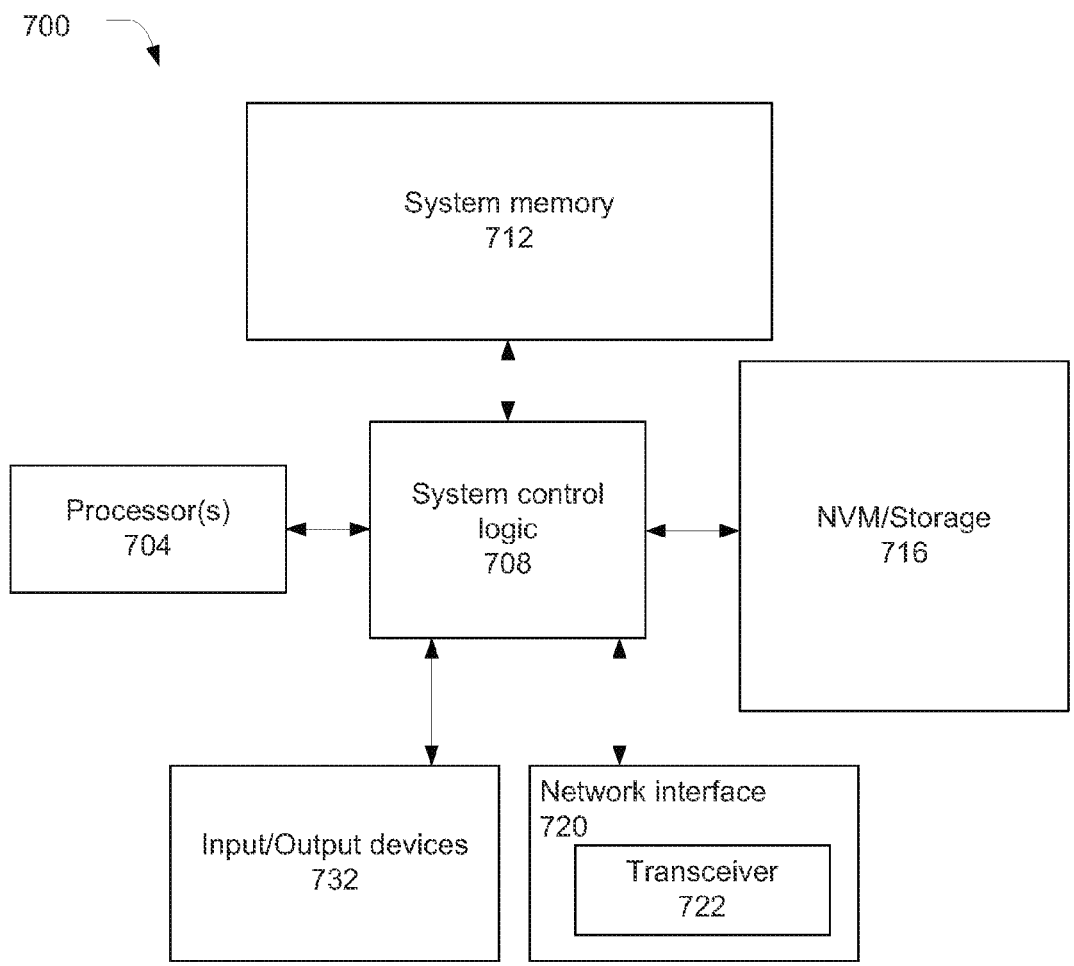
FIG. 7 schematically depicts an example system in accordance with various embodiments.

The eNB 104/112/116 and/or UE 108 described herein may be implemented into a system using any suitable hardware and/or software to configure as desired. FIG. 7 illustrates, for one embodiment, an example system 700 comprising one or more processor(s) 704, system control logic 708 coupled with at least one of the processor(s) 704, system memory 712 coupled with system control logic 708, non-volatile memory (NVM)/storage 716 coupled with system control logic 708, a network interface 720 coupled with system control logic 708, and input/output (I/O) devices 732 coupled with system control logic 708.

The processor(s) 704 may include one or more single-core or multi-core processors. The processor(s) 704 may include any combination of general-purpose processors and dedicated processors (e.g., graphics processors, application processors, baseband processors, etc.).

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, for example, for system 700. System memory 712 for one embodiment may include any suitable volatile memory, such as suitable dynamic random access memory (DRAM), for example.

NVM/storage 716 may include one or more tangible, non-transitory computer-readable media used to store data and/or instructions, for example. NVM/storage 716 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 716 may include a storage resource physically part of a device on which the system 700 is installed or it may be accessible by, but not necessarily a part of, the device. For example, the NVM/storage 716 may be accessed over a network via the network interface 720 and/or over Input/Output (I/O) devices 732.

Network interface 720 may have a transceiver 722 to provide a radio interface for system 700 to communicate over one or more network(s) and/or with any other suitable device. The transceiver 722 may implement communications module 120 of UE 108 or communications module 136 of eNB 104. In various embodiments, the transceiver 722 may be integrated with other components of system 700. For example, the transceiver 722 may include a processor of the processor(s) 704, memory of the system memory 712, and NVM/Storage of NVM/Storage 716. Network interface 720 may include any suitable hardware and/or firmware. Network interface 720 may include a plurality of antennas to provide a multiple input, multiple output radio interface. Network interface 720 for one embodiment may include, for example, a wired network adapter (e.g., an Ethernet network adapter), a wireless network adapter, a telephone modem, and/or a wireless modem.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC). For one embodiment, at least one of the processor(s) 704 may be packaged together with a memory of the NVM/storage 716 to form a package-on-package (PoP). For example, a memory may be coupled with an applications processor and configured as a PoP with the applications processor.

In various embodiments, the I/O devices 732 may include user interfaces designed to enable user interaction with the system 700, peripheral component interfaces designed to enable peripheral component interaction with the system 700, and/or sensors designed to determine environmental conditions and/or location information related to the system 700.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 720 to communicate with components of a positioning network, e.g., a global positioning system (GPS) satellite.

In various embodiments, the system 700 may be a mobile computing device such as, but not limited to, a laptop computing device, a tablet computing device, a netbook, a smartphone, etc. In various embodiments, system 700 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus to be employed by a user equipment (UE), the apparatus comprising:
    one or more processors; and
    one or more non-transitory computer readable media having instructions, stored thereon, that when executed by the one or more processors cause the UE to:
        obtain, from an evolved Node B (eNB) via a wireless communication network, configuration information for a plurality of channel state information (CSI) processes, wherein the configuration information includes a CodebookSubsetRestriction parameter associated with individual CSI processes of the plurality of CSI processes to indicate a subset of precoding matrix indicators within a codebook to be used by the UE for CSI reporting;
        obtain, from the eNB, a message including a CSI request field, wherein the CSI request field indicates one or more of the CSI processes for which the UE is to generate CSI feedback;
        generate CSI feedback for CSI processes indicated by the CSI request field based on the CodebookSubsetRestriction parameter; and
        transmit the CSI feedback to the eNB.

2. The apparatus of claim 1, wherein the CSI request field is to have:
    a first value to indicate that the feedback circuitry is to provide CSI feedback for a first set of the CSI processes; or
    a second value to indicate that the feedback circuitry is to provide a CSI report for a second set of the CSI processes.

3. The apparatus of claim 2, wherein the message is a first message, and wherein the instructions, when executed, further cause the UE to obtain a second message including a CSI request field having a third value to indicate that no CSI feedback is triggered by the second message.

4. The apparatus of claim 2, wherein the first set includes a subset of less than all CSI processes associated with a serving cell as configured by the configuration information.

5. The apparatus of claim 4, wherein the plurality of CSI processes include CSI processes associated with respective ones of a plurality of cells including the serving cell, and wherein the instructions, when executed, further cause the UE to identify the first set of CSI processes associated with the serving cell based on receiving the message on the serving cell.

6. The apparatus of claim 1, wherein individual CSI processes are associated with a CSI reference signal (CSI-RS) resource and a CSI-interference measurement (CSI-IM) resource.

7. The apparatus of claim 1, wherein the configuration information for the plurality of CSI processes is obtained via radio resource control (RRC) signaling, and wherein the message is a downlink control information (DCI) message.

8. The apparatus of claim 1, wherein the generated CSI feedback includes a channel quality indicator (CQI), a precoding matrix indicator (PMI), one or more selected subbands, or a rank indicator (RI).

9. The apparatus of claim 1, wherein the CSI feedback is transmitted to the eNB in a CSI report that includes CSI feedback for a plurality of CSI processes concatenated in increasing order of CSI process index.

10. An apparatus to be employed by an evolved Node B (eNB) of a wireless communication network, the apparatus comprising:
one or more processors;
one or more non-transitory computer readable media having instructions, stored thereon, that when executed by the one or more processors cause the eNB to:
transmit, to a user equipment (UE) via a wireless communication network, configuration information for a plurality of channel state information (CSI) processes, wherein the configuration information includes a CodebookSubsetRestriction parameter associated with individual CSI processes of the plurality of CSI processes to indicate a subset of precoding matrix indicators within a codebook to be used by the UE for CSI reporting;
transmit, to the UE, a message including a CSI request field, wherein the CSI request field indicates one or more of the CSI processes for which the UE is to generate CSI feedback based on the CodebookSubsetRestriction parameter; and
obtain, from the UE, CSI feedback for the one or more CSI processes indicated by the CSI request field.

11. The apparatus of claim 10, wherein the CSI request field is to have:
a first value to indicate that the UE is to provide CSI feedback for a first set of the CSI processes; or
a second value to indicate that the UE is to provide a CSI report for a second set of the CSI processes.

12. The apparatus of claim 11, wherein the message is a first message, and wherein the instructions, when executed, further cause the eNB to transmit a second message to the UE including a CSI request field having a third value to indicate that no CSI feedback is triggered by the second message.

13. The apparatus of claim 11, wherein the first set includes a subset of less than all CSI processes associated with a serving cell as configured by the configuration information.

14. The apparatus of claim 10, wherein the plurality of CSI processes include CSI processes associated with respective ones of a plurality of cells.

15. The apparatus of claim 10, wherein the configuration information for the plurality of CSI processes is transmitted via radio resource control (RRC) signaling, and wherein the message is a downlink control information (DCI) message.

16. The apparatus of claim 10, wherein the generated CSI feedback includes a channel quality indicator (CQI), a precoding matrix indicator (PMI), one or more selected sub-bands, or a rank indicator (RI).

17. The apparatus of claim 10, wherein individual CSI processes are associated with a CSI reference signal (CSI-RS) resource and a CSI-interference measurement (CSI-IM) resource.

* * * * *